United States Patent [19]
Yeomans

[11] Patent Number: 5,639,057
[45] Date of Patent: Jun. 17, 1997

[54] FISHING POLE HANDLE SUPPORT

[76] Inventor: Robert Yeomans, 8232 Washington Ave., Whittier, Calif. 90602

[21] Appl. No.: 505,008

[22] Filed: Jul. 21, 1995

[51] Int. Cl.⁶ .................................................. F16M 13/00
[52] U.S. Cl. .............................................. 248/530; 248/156
[58] Field of Search ................................. 248/530, 156, 248/545, 528, 532, 524, 188.5

[56] References Cited

U.S. PATENT DOCUMENTS

| | | | |
|---|---|---|---|
| 688,489 | 12/1901 | Sattel | 248/188.5 |
| 880,427 | 2/1908 | Thedorf | 248/188.5 |
| 1,217,709 | 2/1917 | Cobel | 248/188.5 |
| 1,324,781 | 12/1919 | Akeley | 248/188.5 |
| 1,810,567 | 6/1931 | Kruger | 248/188.5 |
| 1,843,961 | 2/1932 | Stone | 248/188.5 |
| 2,414,358 | 1/1947 | Calway | 248/156 |
| 2,480,382 | 8/1949 | Pagliuso | 248/188.5 |
| 2,502,684 | 4/1950 | Ward | 248/532 |
| 2,665,866 | 1/1954 | Goldinger | 248/156 |
| 2,746,822 | 5/1956 | Copenhaver | 248/188.5 |
| 2,806,723 | 9/1957 | Fairclough | 248/188.5 |
| 3,182,937 | 5/1965 | Manning | 248/545 |
| 3,318,560 | 5/1967 | Garrette, Jr. et al. | 248/545 |
| 3,704,850 | 12/1972 | Hendrickson et al. | 248/188.5 |
| 4,580,804 | 4/1986 | Weber | 248/188.5 |
| 4,658,534 | 4/1987 | McLean | 248/532 X |
| 5,187,892 | 2/1993 | Gutierrez | 248/156 |
| 5,367,815 | 11/1994 | Liou | 248/528 X |

*Primary Examiner*—Ramon O. Ramirez
*Attorney, Agent, or Firm*—James E. Brunton

[57] ABSTRACT

A fishing pole handle support having an earth penetrating spike which is retractable within the housing of the device so that the device can be safely stowed and transported.

5 Claims, 2 Drawing Sheets 5,639,057

1

FISHING POLE HANDLE SUPPORT

BACKGROUND OF THE INVENTION

1. Field of the Invention

The present invention relates generally to fishing pole holders. More particularly, the invention concerns a novel fishing pole handle support having an earth-penetrating spike which is retractable within the housing of the device so that the device can be safely stowed and transported.

2. Discussion of the Invention

The prior art is replete with devices of various constructions for holding the handle of the fishing pole while fishing from the bank of a lake, river or the like. The simplest of the prior art pole holders typically comprise some type of tubular body within which the pole handle can be placed and an earth penetrating stake which is connected to the tubular body and arranged so that the stake can be forced into the ground to hold the pole in a generally upright position. The more complex prior art pole holders often comprise a body portion made up of rotatably or slidably interconnected members to which the stake is connected and frequently include elaborate locking mechanisms for locking the fishing pole handle within the body portion.

A common drawback of the prior art pole holders is that the earth-penetrating stake, which frequently has a very sharp tip, is exposed during the transport and storage of the device. This can be extremely dangerous since the sharp tip can accidentally puncture the hand or leg of the person transporting the device and can also severely damage seat cushions and other objects placed in the vicinity of the device.

It is this drawback of the prior art devices which the apparatus of the present invention seeks to overcome by providing a highly compact, easy-to-use pole handle support having an earth-penetrating stake which is fully retractable within the pole support housing of the apparatus when the device is not in use. Novel locking means are provided so that the stake portion of the device can be securely locked in either a fully retracted position within the device housing or in an extended earth-penetrating position.

SUMMARY OF THE INVENTION

It is an object of the present invention to provide a novel fishing pole handle support apparatus in which the earth-penetrating stake portion of the apparatus can be safely retracted into a support housing when the device is in a storage or transport mode.

Another object of the invention is to provide a support apparatus of the aforementioned character which is lightweight, compact and easy to use.

Another object of the invention is to provide an apparatus as described in the preceding paragraphs which includes a novel, easy-to-use locking mechanism for locking the earth penetrating spike in either the fully retracted or the extended, earth-penetrating position.

Another object of the invention is to provide a support apparatus which includes easy-to-use securement straps for securely locking the pole handle within the support housing portion of the apparatus.

Another object of the invention is to provide a pole support apparatus which can be used with conventional prior art fishing poles, or alternatively can be built into the handle of the fishing pole at the time of its manufacture.

Another object of the invention is to provide a support apparatus of the class described which is of simple

2 construction, embodies a minimum number of component parts and one which can be easily and inexpensively manufactured.

DESCRIPTION OF THE INVENTION

Figure 1:
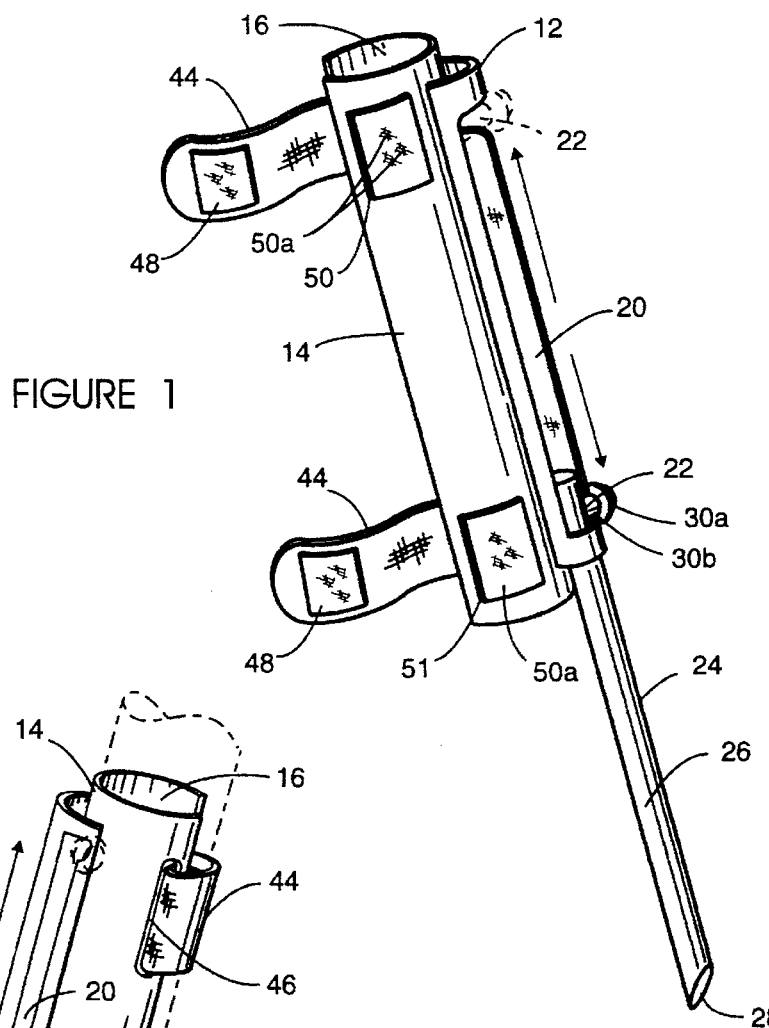
FIG. 1 is a generally perspective view of one form of the fishing pole holder of the present invention showing the earth penetrating stake in an extended position.
Figure 2:
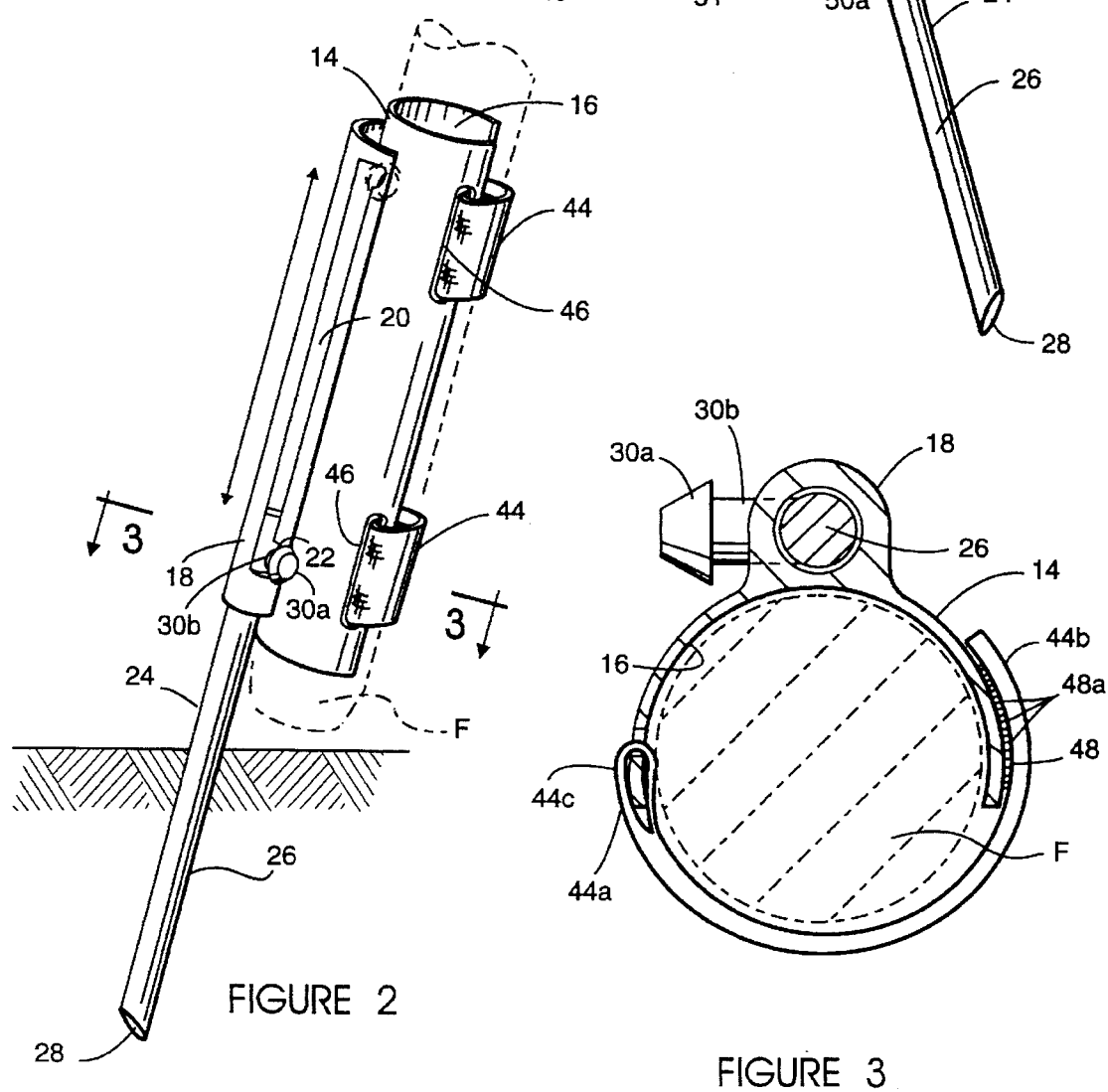
FIG. 2 is a generally perspective view similar to FIG. 1, but showing the apparatus of the invention in an operable configuration supporting a fishing pole in a generally upright position.
Figure 3:
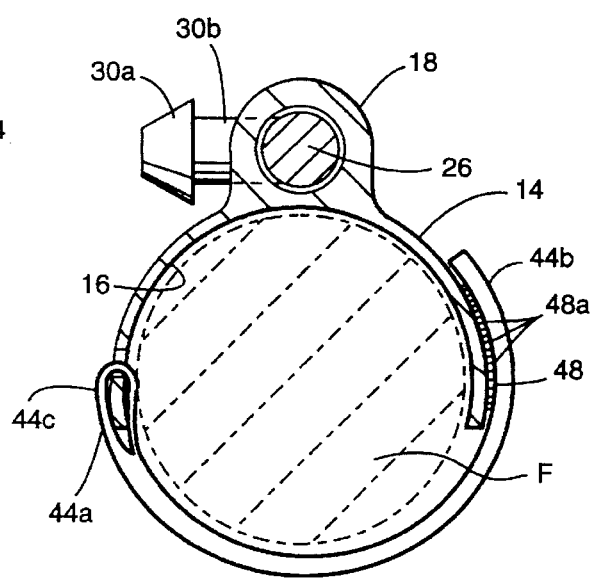
FIG. 3 is an enlarged, cross-sectional view taken along lines 3—3 of FIG. 2.

Referring to the drawings and particularly to FIGS. 1, 2, and 3, one form of fishing pole handle support of the present invention is there illustrated and generally designated by the numeral 12. This embodiment of the invention comprises a support means which includes a generally U-shaped housing 14 having a handle-receiving channel 16 and an integrally formed, elongated, ridge-like protuberance 18. As best seen in FIG. 2, protuberance 18 includes an elongated guideway 20 terminating at each end in a transversely extending slot 22 (see also FIG. 1).

Slidably receivable within guideway 20 is an earth-penetrating spike 24. Spike 24 includes an elongated shaft 26 terminating at one end in the ground engaging tip 28 and having proximate its other end locking means for locking spike 24 in the second, extended position shown in FIG. 2. Spike 24 is slidably movable within guideway 20 from the first extended position shown in FIGS. 1 and 2 to a second retracted position where in shaft 26 along with its penetrating tip 28 are safely received within ridge-like protuberance 18 so as to protect the user against injury from penetrating tip 28.

As shown in FIGS. 1 through 3, the locking means of the form of the invention there shown comprises a locking member for locking the spike in the second extended position shown in FIG. 2. The locking member here comprises a head portion 30a and a neck portion 30b which extends between head 30a and shaft portion 26 of spike 24. With this construction, when the locking spike 24 is slidably moved from the first retracted position to the second extended position shown in FIG. 2, clockwise rotation of shaft 26 within guideway 20 will cause neck portion 30b of the locking means to slide into lower transverse slot 22 in the manner shown in FIG. 2. In this position, the spike 24 is securely locked in its extended position so that the spike 24 can be forcefully inserted into the ground in the manner shown in FIG. 2. With the spike 24 in this position, the fishing pole handle "F", which is shown in dotted lines in FIG. 2, can be receivably positioned within channel 16 and locked within the channel by the securement means of the invention, the nature of which will presently be described.

When it is desired to transport the apparatus of the invention, the earth-penetrating spike 24 is pulled from the earth and shaft 26 is rotated in a counter-clockwise direction by gripping head 30a with the fingers. The earth-penetrating spike is then urged upwardly of guideway 20 with neck 30b functioning to slidably guide the upward travel of neck 30b within guideway 20. When the spike 24 is fully retracted within the protuberance 18, a clockwise rotation of shaft 26 will cause neck portion 30b of the locking means to slide into a locked position within upper slot 22 as shown by the phantom lines in FIG. 1, thereby securely locking the spike 24 in the retracted position. The earth-penetrating spike 24 will remain in the retracted position until the device is ready for further use. At this time, shaft 26 can be rotated in a counter-clockwise direction by gripping head 30a and rotating the shaft 26 to a position wherein neck 30b will enter guideway 20. A downward movement exerted on head 30a will cause the spike 24 to move into the first extended position wherein it can be locked by clockwise rotation of the shaft 26 in a manner to cause neck 30b to enter lower slot 22 in the manner shown in FIG. 2. Handle "F" can then be inserted into the channel 16 and strapped into position by the securement means of the invention. The device can then be placed into the position shown in FIG. 2 by exerting a downward force on earth-penetrating spike 24 so that tip 28 will penetrate the earth and extend downwardly into the earth in the manner shown in FIG. 2.

Considering now the important securement means of the invention, which here comprises a pair of spaced-apart straps 44 each of which has first and second ends 44a and 44b respectfully (FIG. 3). Each end 44a is provided with a loop portion 44c which is received within slots 46 formed in housing 14 so that end 44a is secured in position within slots 46 in a manner best seen in FIG. 3. Provided proximate second end 44b of each of the straps is a fabric strip 48 provided with a multiplicity of hooks 48a. Hooks 48a are adapted to engage a multiplicity of upstanding loops 50a provided on first and second strips of fabric 50 and 51 which are secured to housing 14 in a manner best seen in FIG. 1. With straps 44 in the open position shown in FIG. 1, the fishing pole handle can be readily inserted into channel 16 and held in position therein while each of the straps 44 is wrapped around the handle so that hooks 48a provided on the fabric strips 48 can be moved into secured gripping engagement with loops 50a provided on the fabric strips 50 and 51 which are affixed to housing 14. While a variety of commercially available fabric strips can be used to form the securement means, a satisfactory hook and loop type fabric for the purpose is sold under the name and style of VEL-CRO.

Figure 4:
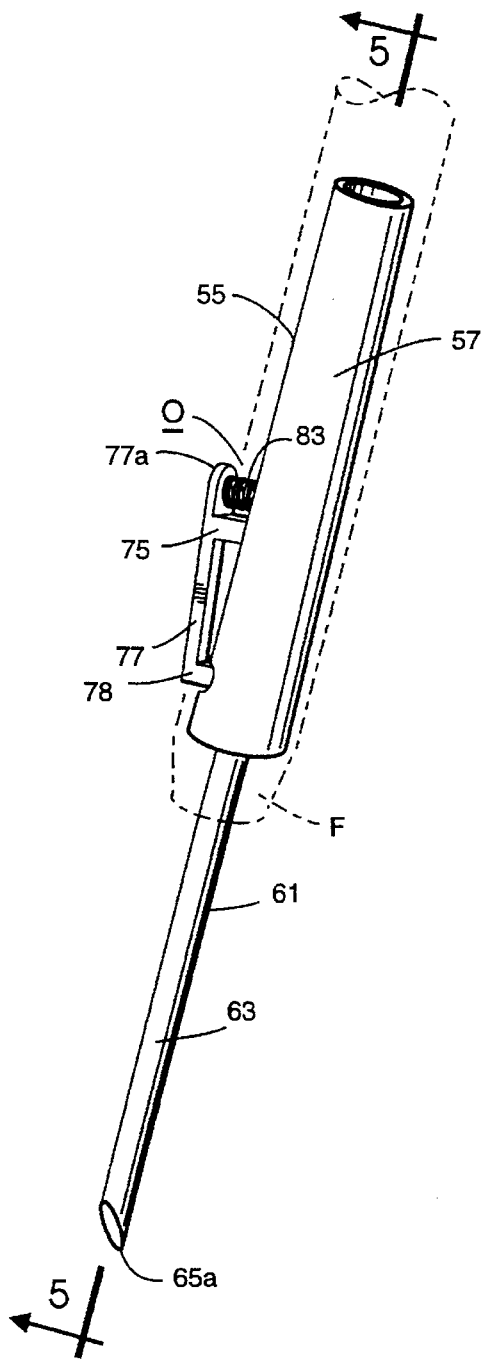
FIG. 4 is a generally perspective view of an alternate form of the apparatus of the present invention in which the housing of the device is receivable within the handle of a fishing pole.
Figure 5:
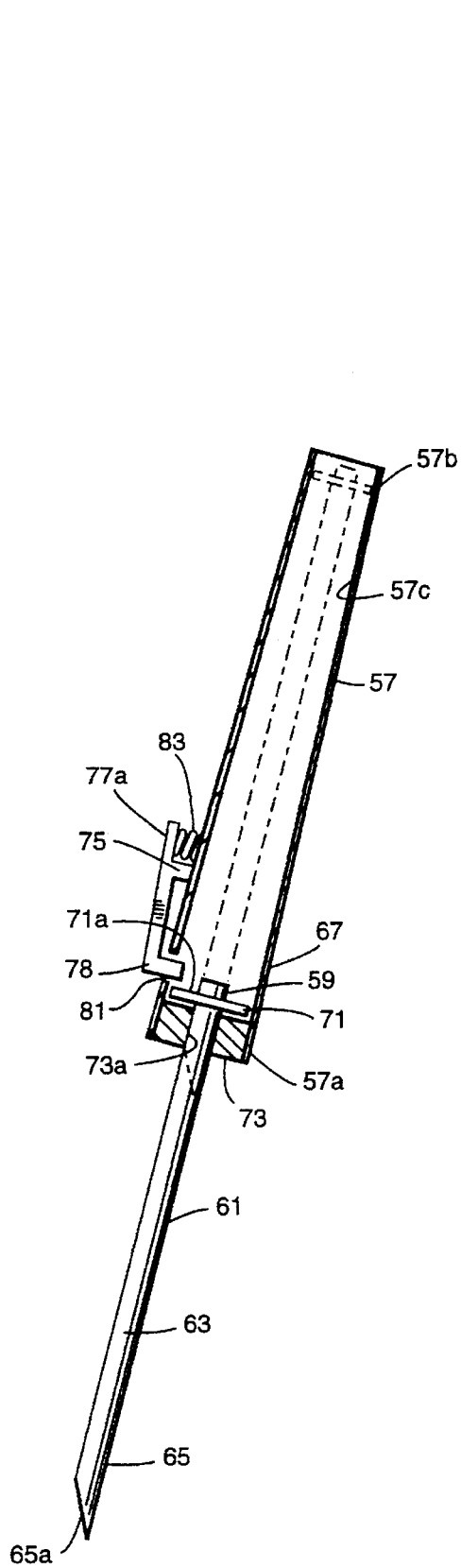
FIG. 5 is a cross-sectional view taken along lines 5—5 of FIG. 4.

Turning now to FIGS. 4 and 5, an alternate embodiment of the fishing pole handle support of the present invention is there illustrated and generally identified by the numeral 55. This embodiment of the invention is similar in some respects to the embodiment just described and includes support means for supporting the fishing pole handle "F", which support means is here provided as a generally tubular shaped housing 57 which is receivable interiorly of the fishing pole handle "F" in the manner shown in FIG. 4. In this regard, handle "F" can be provided with an interior cavity which receives housing 57 or the handle can be formed about the housing in a manner well known to those skilled in the art. As best seen in FIG. 5, housing 57 has a first end 57a having a first diameter and a second opposite end 57b having a second lesser diameter. An inwardly tapering interior wall 57c interconnects ends 57a and 57b.

Telescopically movable within housing 57 between a first extended position shown in FIG. 5 and a second retracted position, is an earth-penetrating spike assembly generally designated by the numeral 59. Spike assembly 59 comprises an earth-penetrating spike 61 having a shaft portion 63 and first and second ends 65 and 67. First end 65 terminates in a penetrating tip 65a for penetrating the surface of the earth. Affixed proximate end 67 is a generally annular shaped member 71 which, in a manner presently to be described, functions to releasably lock the earth-penetrating spike 61 in the retracted position shown by the phantom lines in FIG. 5.

Provided interiorly of the first end of tubular housing 57 is a bushing 73 having a central bore 73a for closely slidably receiving shaft 63 of penetrating spike 61. Since annular-shaped member 71 is of a diameter slightly larger than the diameter of end 57b of housing 57, as the earth-penetrating spike is moved from the extended ground engaging position shown in FIG. 5 to the retracted position shown by the dotted lines in FIG. 5, the edges of annular-shaped member 71 will frictionally engage inner wall 57c of tubular member 57 thereby releasably locking the earth-penetrating spike assembly 59 in the retracted position shown by the dotted lines of FIG. 5. To enhance the locking capability of member 71, it is preferably constructed of a plastic material such as a suitable polymer.

As before, locking means are also provided to releasably lock the earth-penetrating spike assembly 59 in its second extended position shown in FIG. 5. This novel locking means, which resides within an axially extending opening O formed in pole handle "F", here comprises a radially outwardly extending fulcrum-defining member 75 which is connected to housing 57 proximate end 57a. Connected to member 75 is a lever arm 77 which is pivotally movable relative to housing 57 between first and second positions. More particularly, when lever arm 77 is in the second position shown in FIG. 5, a radially inwardly extending leg 78 will extend through an aperture 81 formed in housing 57 so as to lockably engage the top surface 71a of annular member 71 when the earth-penetrating spike is in the extended position shown in FIG. 5.

To release the locking means, a downward pressure is exerted on first end 77a of lever arm 77. This will cause the lever arm to pivot about fulcrum member 75 against the urging of a biasing means shown here as a coil spring 83. As spring 83 is compressed, leg 78 will move outwardly of aperture 81 thereby allowing passage of annular member 71 inwardly of housing 57 into the stowed and locked position shown by the dotted lines in FIG. 5.

In using the form of the invention shown in FIGS. 4 and 5, with the earth-penetrating spike 61 in its stowed position shown by the dotted lines in FIG. 5. An inward pressure is exerted on end 77a of lever arm 77 and the tip of the shaft 63 is gripped by reaching into the hollow end of handle "F". By pulling downwardly on the earth-penetrating spike 61 it can be freely extended into the second position shown in FIG. 5. Upon a release of pressure exerted on end 77a of lever arm 77, spring 83 will urge leg 78 of the locking means inwardly through aperture 81 and into blocking engagement with annular member 71 thereby preventing upward movement of the earth-penetrating spike 61 into housing 57. The handle of the fishing pole within which housing 57 has previously been factory mounted can then be urged downwardly so that earth-penetrating spike 61 will then penetrate the earth and maintain the fishing pole in the angularly, upwardly extending orientation shown in FIG. 4 and 5.

When it is desired to stow the earth-penetrating member for safe transport, a pressure exerted on end 77a of lever arm 77 will once again permit the earth-penetrating spike 61 to be moved inwardly of handle 57 to a position wherein annular member 71 frictionally engages internal wall 57c of housing 57 thereby securely locking the spike 61 in the retracted position for safe transport.

In the construction of both of the embodiments of the invention discussed herein, the housings of the support means are preferably constructed of a rigid plastic or light weight metal, while the earth penetrating spike is preferably constructed of a suitable steel alloy.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A fishing pole handle support for supporting a fishing pole handle comprising:
   (a) an inwardly tapering wall defining hollow housing disposed interiorly of the fishing pole handle, said hollow housing having upper and lower end portions of different diameters;
   (b) an earth-penetrating spike assembly telescopically movable within said housing between a first extended position and a second retracted position, said spike assembly including an elongated shaft having first and second ends and an annular member connected to said shaft proximate said second end thereof said housing having a first end of a first diameter and a second inboard end of a second lesser diameter, said annular member having a diameter greater than said second diameter of said housing, whereby said annular member will frictionally engage said inwardly tapering wall when said spike is in said second retracted position to releasably maintain said spike in said second retracted position; and
   (c) locking means connected to said hollow housing for locking said earth-penetrating spike in said first extended position.

2. A support as defined in claim 1 in which said housing includes an aperture and in which said locking means includes:
   (a) a fulcrum defining member connected to said housing;
   (b) a lever arm connected to said fulcrum defining member for pivotal movement relative to said fulcrum defining member between first and second positions, said lever arm having a first end and a spaced apart second end terminating in a leg receivable within said aperture for locking engagement with said annular member when said lever arm is in said second position; and
   (c) biasing means for yieldably resisting movement of said lever arm toward said first position.

3. A support as defined in claim 2 in which said biasing means comprises a coil spring deployed between said housing and said first end of said lever arm.

4. A support as defined in claim 2 further including a bushing receivable within said first end of said housing for guiding movement of said shaft as said spike moves between said first and second positions.

5. A fishing pole handle support comprising:
   (a) a generally U-shaped housing having a handle receiving channel and an integrally formed, elongated protuberance having an elongated longitudinally extending guideway having first and second longitudinally spaced, transversely extending slots;
   (b) an earth-penetrating spike slidably received within said guideway for movement between a first extended position and a second retracted position, said spike having an elongated shaft terminating at one end of a ground penetrating tip and having proximate its other end a gripping member including a neck portion receivable in a selected one of said transversely extending slits upon rotation of said shaft within said guideway;
   (c) a pair of spaced-apart fabric straps connected to said generally U-shaped housing for encircling the pole handle to retain it within said handle receiving channel, each of said straps being provided with a fabric strip having a multiplicity of hooks; and
   (d) a pair of spaced-apart fabric strips connected to said housing each having a multiplicity of small upstanding loops engageable by said hooks.

\* \* \* \* \*